United States Patent
Michiuchi et al.

(10) Patent No.: US 11,396,451 B2
(45) Date of Patent: Jul. 26, 2022

(54) TUNGSTEN CARBIDE POWDER AND PRODUCTION METHOD THEREFOR

(71) Applicant: Sumitomo Electric Industries, Ltd., Osaka (JP)

(72) Inventors: Masato Michiuchi, Osaka (JP); Takamasa Onoki, Osaka (JP); Katsumi Okamura, Osaka (JP); Takayuki Fudo, Toyama (JP); Takehiko Hayashi, Toyama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/601,431

(22) PCT Filed: Apr. 21, 2020

(86) PCT No.: PCT/JP2020/017138
§ 371 (c)(1),
(2) Date: Oct. 5, 2021

(87) PCT Pub. No.: WO2020/230543
PCT Pub. Date: Nov. 19, 2020

(65) Prior Publication Data
US 2022/0089447 A1    Mar. 24, 2022

(30) Foreign Application Priority Data

May 13, 2019   (JP) .............................. JP2019-090779

(51) Int. Cl.
*C01B 32/949* (2017.01)
*B01J 6/00* (2006.01)

(52) U.S. Cl.
CPC ............. *C01B 32/949* (2017.08); *B01J 6/001* (2013.01); *C01P 2004/03* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| | | | |
|---|---|---|---|
| 2005/0036934 A1 | 2/2005 | Sandberg et al. | |
| 2007/0214911 A1 | 9/2007 | Kim et al. | |

FOREIGN PATENT DOCUMENTS

| | | |
|---|---|---|
| CN | 106219547 A | 12/2016 |
| CN | 107585768 A | 1/2018 |
| JP | 5-147916 A | 6/1993 |

(Continued)

OTHER PUBLICATIONS

Sandberg et al, JP 2005-060224, English Translation from J-PlatPat (Year: 2005).*

(Continued)

*Primary Examiner* — Colin W. Slifka
(74) *Attorney, Agent, or Firm* — Xsensus LLP (57) ABSTRACT

A tungsten carbide powder contains tungsten carbide as a main component and chromium, in which, when mass concentrations of tungsten and chromium are measured at 100 or more analysis points randomly selected from a field of view of SEM observation of the tungsten carbide powder, a standard deviation σ of distribution of the ratio by percentage of the concentration of chromium to the total concentration of tungsten and chromium is 0.5 or less.

4 Claims, 2 Drawing Sheets

(56) References Cited

FOREIGN PATENT DOCUMENTS

| | | |
|---|---|---|
| JP | 5-147917 A | 6/1993 |
| JP | 2005-60224 A | 3/2005 |
| JP | 2007-269534 A | 10/2007 |

OTHER PUBLICATIONS

Decision to Grant dated Dec. 8, 2020, received for JP Application 2020-555065, 5 pages including English Translation.

* cited by examiner

APPEARANCE OF WC POWDER OF EXAMPLE 1

(CONCENTRATION OF Cr CONTAINED IN ENTIRE POWDER: 1.2mass%)

FIG.3

APPEARANCE OF WC POWDER OF COMPARATIVE EXAMPLE 1

(CONCENTRATION OF Cr CONTAINED IN ENTIRE POWDER: 1.2mass%)

TUNGSTEN CARBIDE POWDER AND PRODUCTION METHOD THEREFOR

CROSS-REFERENCE TO RELATED APPLICATIONS

The present application is based on PCT filing PCT/JP2020/017138, filed Apr. 21, 2020, which claims priority to JP 2019-090779, filed on May 13, 2019, the entire contents of each are incorporated herein by reference.

TECHNICAL FIELD

The present disclosure relates to a tungsten carbide powder and a production method therefor.

BACKGROUND ART

Hitherto, in order to enhance the hardness and flexural strength of cemented carbides, high-quality, submicron, fine tungsten carbide powders have been improved. Examples thereof are disclosed, for example, in Japanese Unexamined Patent Application Publication No. 2007-269534 (PTL 1), Japanese Unexamined Patent Application Publication No. 5-147917 (PTL 2), and Japanese Unexamined Patent Application Publication No. 5-147916 (PTL 3).

CITATION LIST

Patent Literature

PTL 1: Japanese Unexamined Patent Application Publication No. 2007-269534
PTL 2: Japanese Unexamined Patent Application Publication No. 5-147917
PTL 3: Japanese Unexamined Patent Application Publication No. 5-147916

SUMMARY OF INVENTION

A tungsten carbide powder according to the present disclosure contains tungsten carbide as a main component and chromium, in which, when mass concentrations of tungsten and chromium are measured at 100 or more analysis points randomly selected from a field of view of SEM observation of the tungsten carbide powder, a standard deviation σ of distribution of the ratio by percentage of the concentration of chromium to the total concentration of tungsten and chromium is 0.5 or less.

DESCRIPTION OF EMBODIMENTS

Problems to be Solved by Present Disclosure

A tungsten carbide powder suitable for production of a cemented carbide has been required.

Advantageous Effects of Present Disclosure

According to the present disclosure, it is possible to provide a tungsten carbide powder suitable for production of a cemented carbide.

DESCRIPTION OF EMBODIMENTS OF PRESENT DISCLOSURE

First, embodiments of the present disclosure will be enumerated and described.

Hitherto, when producing a cemented carbide whose constituent crystal grains are fine, the particle size of tungsten carbide has tended to be non-uniform, resulting in a decrease in the strength of the cemented carbide.

The reason for this is that, when tungsten carbide has fine grains, abnormal grain growth is likely to occur because of Ostwald ripening during sintering. Furthermore, since a chromium powder which is a grain growth inhibitor is also solid, segregation is likely to occur, and it is difficult to suppress abnormal grain growth.

As described above, in known tungsten carbide powders and methods for producing a cemented carbide using the same, since dispersion of chromium carbide which is a grain growth inhibitor is nonhomogeneous, local abnormal grain growth cannot be completely inhibited during production of the cemented carbide, and in particular, in an ultra-fine cemented carbide with a crystal grain size of 0.6 μm or less, there is a problem in that a decrease in flexural strength or the like is likely to occur.

In order to solve the problem of the decrease in alloy strength due to nonhomogeneity of chromium carbide, the present inventors have reconsidered the chromium addition method and the tungsten carbide production process and performed thorough studies, and as a result, the present disclosure has been devised.

That is, a method for producing a tungsten carbide powder according to the present disclosure includes a step of obtaining a mixed dry powder by mixing a tungsten oxide and a chromium-containing solution, followed by drying under stirring; a step of obtaining a calcined powder by calcining the dry powder; a step of obtaining a mixed powder by mixing the calcined powder and a carbon source powder; and a step of obtaining a tungsten carbide powder by reducing the mixed powder by heat treatment in hydrogen gas and carburizing the mixed powder at a temperature of 1,000° C. or higher.

Figure 1:
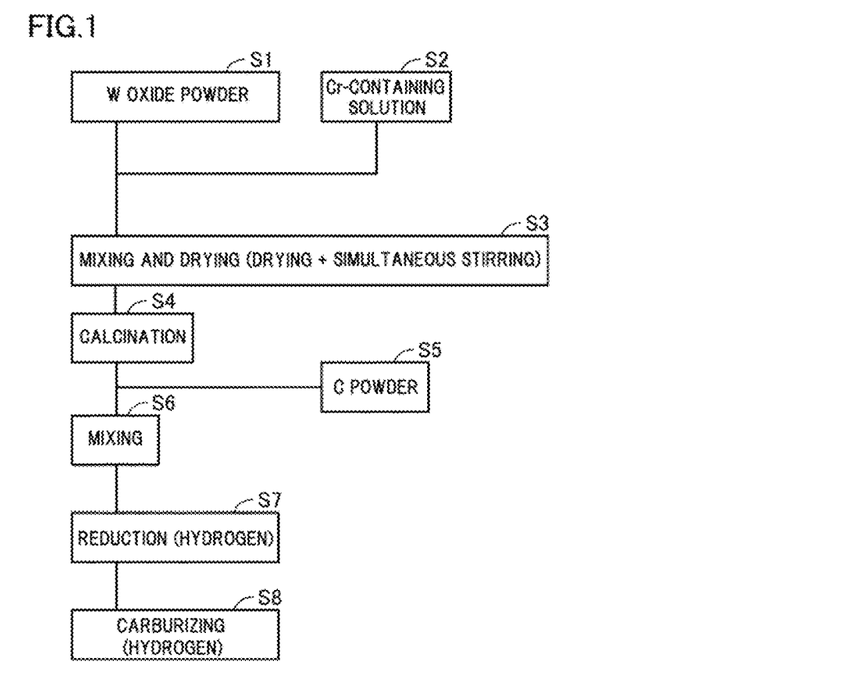
FIG. 1 is a flow chart showing an example of a production method for a tungsten carbide powder according to the present disclosure.

FIG. 1 is a flow chart showing an example of a production method for a tungsten carbide powder according to the present disclosure. First, a tungsten oxide powder is prepared (step S1). The tungsten oxide powder is not particularly limited. $WO_3$, $WO_{2.9}$, or the like can be selected depending on the convenience of a person skilled in the art. The particle size thereof can also be selected freely. A chromium-containing solution is prepared (step S2). Examples of a compound that can be used as the chromium-containing solution include chromium chloride, chromium nitrate, chromium sulfate, chromium acetate, and chromium phosphate. The tungsten oxide powder and the chromium-containing solution are mixed to obtain a mixture.

By drying the mixture under stirring, a mixed dry powder is obtained (step S3). The mixing device is not particularly limited. For example, a Henschel mixer manufactured by Nippon Coke & Engineering Co., Ltd., a universal dryer manufactured by Shinagawa Machinery Works Co., Ltd., a spray dryer manufactured by Ohkawara Kakohki Co., Ltd., or the like can be used.

The mixed dry powder is held at a predetermined temperature in the air atmosphere to perform calcination (step S4). By the calcination, chromium is immobilized on the surface of the tungsten oxide powder. Here, a suitable calcination temperature is 150° C. or higher and 300° C. or lower. In this range, the effect of homogeneous dispersion of chromium becomes highest.

A carbon powder is prepared (step S5). In the calcined powder obtained by calcination, a carbon source powder for reducing/carburizing tungsten oxide and chromium oxide is compounded, and by mixing these, a mixed powder is obtained (step S6). The carbon source powder can be appropriately selected by the user. For example, a pyrolytic graphite powder with a particle size of about 0.5 µm, or the like can be suitably used. The device for mixing powder is not particularly limited. The Henschel mixer or the like used in step S3 can also be employed.

The mixed powder is heat-treated in hydrogen gas to reduce oxides, and a reduced powder containing tungsten, chromium, and carbon is obtained (step S7). Here, a suitable reduction temperature is 500° C. or higher and 1,100° C. or lower. In this range, the particle size of the tungsten powder can be controlled.

Subsequently, the reduced powder is carburized by heat treatment, for example, in an atmosphere containing hydrogen gas, and at 1,000° C. or higher to obtain a tungsten carbide powder (step S8). Here, the heat treatment temperature is suitably in a range of 1,100° C. or higher and 1,600° C. or lower. The atmosphere contains hydrogen gas, which is suitable for bringing the amount of bonded carbon of the tungsten carbide powder closer to 6.13% by mass which is a stoichiometric ratio. The heat treatment temperature is appropriately selected so as to obtain a target particle size of tungsten carbide. At a low temperature, fine tungsten carbide can be produced, and at a high temperature, coarse tungsten carbide can be produced.

Regarding the hydrogen gas used in the reduction and carburizing steps, the concentration thereof is not limited to 100%. Depending on the convenience of a person skilled in the art, for example, hydrogen may be mixed with nitrogen, argon, or the like, and the concentration may be set in the range of 25% to 100%. Furthermore, in the reduction step (step S7), carburizing may be performed, and in the carburizing step (step S8), reduction may be performed.

In the tungsten carbide powder according to the present disclosure obtained by the production method described above, dispersion of chromium is made very homogeneous. More specifically, a tungsten carbide powder according to the present disclosure contains tungsten carbide as a main component and chromium, in which, when mass concentrations of tungsten and chromium are measured at 100 or more analysis points randomly selected from a field of view of SEM observation of the tungsten carbide powder, a standard deviation σ of distribution of the ratio by percentage of the concentration of chromium to the total concentration of tungsten and chromium is 0.5 or less.

As a suitable analyzer for measuring the mass concentration of chromium, SEM (Scanning Electron Microscope)/EDS (Energy dispersive X-ray spectrometry) can be used.

When the standard deviation of the concentration of chromium at analysis points randomly selected, i.e., in many tungsten carbide grains, is within the specified range, the individual tungsten carbide grains benefit from the uniform grain growth inhibiting effect by chromium during liquid-phase sintering, the driving force for grain growth is made uniform, and thus, a homogeneous cemented carbide can be obtained.

Furthermore, in the tungsten carbide powder according to the present disclosure, the concentration of chromium contained in the entire powder may be 0.1% by mass or more and 7.0% by mass or less. When the concentration of chromium is in this range, improvement in cemented carbide characteristics due to homogenization of chromium is easily obtained. More preferably, the concentration of chromium is 0.8% by mass or more and 7.0% by mass or less.

Preferably, the tungsten carbide powder has an average particle size of 1.0 µm or less. In this case, a cemented carbide with a fine crystal grain size can be produced. More preferably, the average particle size of the tungsten carbide powder is 0.8 µm or less.

Detailed Description of Embodiments of Present Disclosure

Next, Examples of the present disclosure will be described. Note that Examples are merely embodiments of the invention and can be changed within a range obvious to a person skilled in the art.

First, a tungsten trioxide powder having an average particle size of 3.0 µm serving as a tungsten oxide powder and chromium acetate (Wako Pure Chemical Industries, Ltd.) serving as a chromium-containing solution are prepared. The tungsten oxide powder is introduced into a rotating-blade type mixer, and chromium acetate is dissolved in pure water and adjusted to a desired concentration. The concentration of the chromium-containing solution can be appropriately adjusted by a person skilled in the art. Here, an adjustment was made to obtain a 40% aqueous chromium acetate solution. While stirring the powder with the mixer, the chromium-containing solution is sprayed to the powder so as to obtain a desired chromium concentration, and these are mixed. In Examples, a Henschel mixer manufactured by Nippon Coke & Engineering Co., Ltd. was used. Here, mixing was performed under the conditions in which the diameter of the rotating blade was 60 cm, the peripheral speed was 1,884 m/min, and the mixing time was 30 minutes. Drying is simultaneously performed using, as a heat source, the frictional heat of powder during mixing to obtain a mixed dry powder (step of obtaining a mixed dry powder).

Next, the mixture is charged into an electric furnace manufactured by Yamato Scientific Co., Ltd. and left to stand at 300° C. for 24 hours in the air atmosphere to perform calcination (step of obtaining a calcined powder).

After cooling, the calcined powder is taken out and mixed together with a carbon powder with an average particle size of about 1.0 µm using a Henschel mixer (diameter of rotating blade: 60 cm, peripheral speed: 1,884 m/min, and mixing time: 30 minutes) to produce a mixed powder (step of obtaining a mixed powder).

The mixed powder is charged into a firing furnace, and reduction treatment is performed in a hydrogen flow at a temperature of 800° C. for a holding time of 1 hour to obtain a reduced powder (step of obtaining a reduced powder).

Furthermore, with the reduced powder remaining in the firing furnace, carburizing treatment is performed in a pure hydrogen flow at a temperature of 1,200° C. for a holding time of 1 hour to obtain a tungsten carbide powder (step of obtaining a tungsten carbide powder).

The produced tungsten carbide powder is subjected to disintegration treatment with a ball mill using φ3 mm cemented carbide balls, and characteristics of the powder are measured. In the present disclosure, homogeneity of chromium was measured by SEM/EDS observation on the appearance of powder, the average particle size was measured using a Fisher sub-sieve sizer (FSSS), and the concentration (% by mass) of chromium in the powder was measured by ICP (Inductively Coupled Plasma).

A procedure for measurement of homogeneity of chromium by the analysis methods will be described in detail below.

(1) SEM/EDS Analysis on Appearance of Powder

First, a tungsten carbide powder which is an aggregate of tungsten carbide particles is fixed on an observation holder using a carbon double-sided adhesive tape or the like. This is inserted into an SEM and observed at an accelerating voltage of 15 kV. The type of SEM and EDS detector to be used is not particularly limited. In Examples, the analysis is performed using an XFlash Detector manufactured by BRUKER. The observation magnification is selected depending on the particle size of the target tungsten carbide. For example, when the average particle size is 0.5 μm, a magnification of about 3,000 times is suitable. In the field of view, EDS profiles are randomly collected from a predetermined number or more of points, preferably, from 100 or more analysis points of the tungsten carbide powder. The selection procedure for particles is not particularly limited if selected at random. For example, analysis points are chosen using a rectangular grid (10 points×10 points) with a grid spacing of about 1.5 μm. It is possible to mechanically obtain EDS profiles from 100 analysis points. In Examples, analysis points are chosen using a rectangular grid (12 points×9 points) with a grid spacing of 2.0 μm, and at 108 (12×9) points, EDS profiles are obtained from tungsten carbide particles.

The conditions for obtaining EDS at each point are not particularly limited, but it should be taken into consideration that measurement errors are minimized. For example, the accumulated number of counts (net count) of tungsten (Lα radiation) is preferably adjusted to be 50,000 counts or more. In Examples, under the condition that the count rate (ICR) per second of characteristic X-rays is about 30,000 cps, EDS profiles were obtained at an accumulation time of 1 minute per point. The obtained EDS profiles are semi-quantitatively analyzed by so-called ZAF corrections in which true concentrations are obtained by performing an atomic number correction (Z), an absorption correction (A), and a fluorescence correction (F) to quantify the mass concentrations of tungsten and chromium.

As described above, from 100 or more tungsten carbide particles or analysis points, the concentrations of tungsten and chromium are measured, which are used in the statistical analysis which will be described later.

(2) Analysis of Standard Deviation of Concentration of Chromium

From the concentrations of tungsten and chromium measured by the technique described above, a statistical analysis is performed using known spreadsheet software to obtain the standard deviation of the concentration of chromium in the tungsten carbide powder. For example, as the known spreadsheet software, Excel produced by Microsoft Corporation can be used. More specifically, by using the STDEV.P function in Excel, the standard deviation of the concentration of chromium in the tungsten carbide powder can be obtained.

The tungsten carbide powder of Example 1 according to the present disclosure was produced and analyzed as described above, and the results thereof are shown in FIG. 2 and Table 1.

TABLE 1

Cr concentration at each analysis point obtained from WC powder of Example 1

| Analysis point | Cr concentration/(W concentration + Cr concentration) (mass %) |
|---|---|
| 1 | 1.281 |
| 2 | 1.117 |
| 3 | 0.951 |
| 4 | 1.158 |
| 5 | 1.103 |
| 6 | 0.995 |
| 7 | 0.815 |
| 8 | 0.699 |
| 9 | 1.309 |
| 10 | 1.927 |
| 11 | 1.188 |
| 12 | 1.097 |
| 13 | 1.299 |
| 14 | 0.932 |
| 15 | 1.353 |
| 16 | 0.933 |
| 17 | 1.188 |
| 18 | 0.917 |
| 19 | 0.805 |
| 20 | 0.865 |
| 21 | 1.123 |
| 22 | 0.926 |
| 23 | 1.911 |
| 24 | 1.435 |
| 25 | 1.075 |
| 26 | 1.242 |
| 27 | 0.932 |
| 28 | 1.274 |
| 29 | 1.797 |
| 30 | 1.092 |
| 31 | 1.538 |
| 32 | 1.294 |
| 33 | 1.138 |
| 34 | 1.217 |
| 35 | 0.788 |
| 36 | 2.616 |
| 37 | 1.109 |
| 38 | 0.889 |
| 39 | 0.954 |
| 40 | 1.190 |
| 41 | 1.254 |
| 42 | 1.048 |
| 43 | 0.841 |
| 44 | 1.293 |
| 45 | 0.742 |
| 46 | 1.120 |
| 47 | 1.167 |
| 48 | 1.368 |
| 49 | 0.928 |
| 50 | 0.991 |
| 51 | 1.181 |
| 52 | 1.050 |
| 53 | 1.029 |
| 54 | 0.945 |
| 55 | 1.193 |
| 56 | 1.404 |
| 57 | 1.354 |
| 58 | 1.409 |
| 59 | 1.350 |
| 60 | 1.317 |
| 61 | 0.932 |
| 62 | 0.923 |
| 63 | 1.046 |
| 64 | 1.419 |
| 65 | 0.674 |
| 66 | 0.823 |
| 67 | 1.198 |
| 68 | 1.259 |

TABLE 1-continued

Cr concentration at each analysis point
obtained from WC powder of Example 1

| Analysis point | Cr concentration/(W concentration + Cr concentration) (mass %) |
|---|---|
| 69 | 1.248 |
| 70 | 0.913 |
| 71 | 0.824 |
| 72 | 1.097 |
| 73 | 1.133 |
| 74 | 1.311 |
| 75 | 1.075 |
| 76 | 0.947 |
| 77 | 0.772 |
| 78 | 0.814 |
| 79 | 1.332 |
| 80 | 0.930 |
| 81 | 0.990 |
| 82 | 1.047 |
| 83 | 1.016 |
| 84 | 0.755 |
| 85 | 1.512 |
| 86 | 1.174 |
| 87 | 0.722 |
| 88 | 0.875 |
| 89 | 1.121 |
| 90 | 1.329 |
| 91 | 1.500 |
| 92 | 1.567 |
| 93 | 1.137 |
| 94 | 1.185 |
| 95 | 1.059 |
| 96 | 1.068 |
| 97 | 1.195 |
| 98 | 0.969 |
| 99 | 1.004 |
| 100 | 0.974 |
| 101 | 1.133 |
| 102 | 1.855 |
| 103 | 3.766 |
| 104 | 3.532 |
| 105 | 0.791 |
| 106 | 0.951 |
| 107 | 1.213 |
| 108 | 0.834 |

Figure 3:
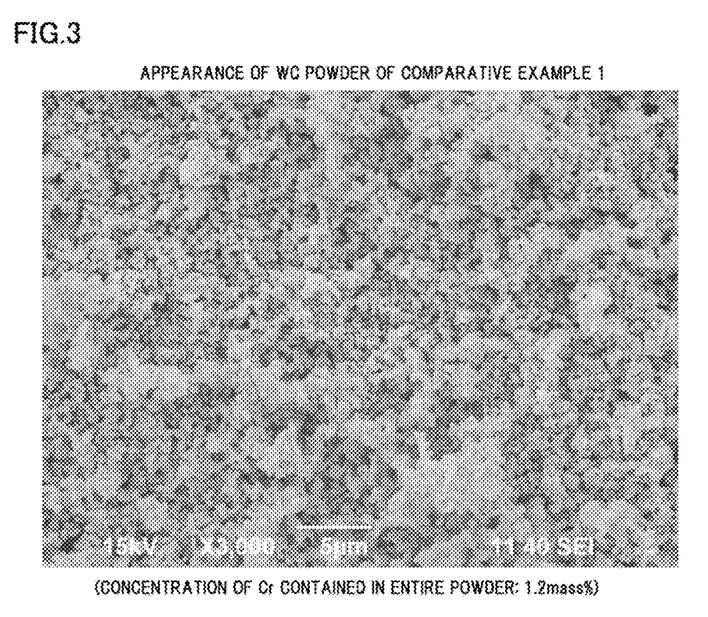
FIG. 3 is a photograph showing the appearance of a tungsten carbide powder of Comparative Example 1.

In order to produce a tungsten carbide powder of Comparative Example 1, a tungsten trioxide ($WO_3$) powder having an average particle size of 3.0 μm, a chromium oxide ($Cr_2O_3$) powder having an average particle size of 2.0 μm, and a carbon powder having an average particle size of 1.0 μm were mixed using a Henschel mixer (diameter of rotating blade: 60 cm, peripheral speed: 1,884 m/min, and mixing time: 30 minutes). The mixed powder was subjected to reduction heat treatment in a hydrogen flow at a temperature of 800° C. for a holding time of 1 hour. Furthermore, carburizing treatment was performed in a hydrogen-nitrogen mixture flow (hydrogen concentration 50% by volume) at a temperature of 1,200° C. for a holding time of 1 hour to obtain a tungsten carbide powder of Comparative Example 1. The results thereof are shown in FIG. 3 and Table 2.

TABLE 2

Cr concentration at each analysis point obtained
from WC powder of Comparative Example 1

| Analysis point | Cr concentration/(W concentration + Cr concentration) (mass %) |
|---|---|
| 1 | 0.833 |
| 2 | 0.694 |
| 3 | 0.876 |
| 4 | 0.465 |
| 5 | 2.235 |
| 6 | 0.529 |
| 7 | 1.149 |
| 8 | 0.641 |
| 9 | 1.951 |
| 10 | 0.755 |
| 11 | 1.135 |
| 12 | 0.826 |
| 13 | 1.799 |
| 14 | 0.684 |
| 15 | 6.698 |
| 16 | 1.165 |
| 17 | 0.935 |
| 18 | 0.846 |
| 19 | 0.469 |
| 20 | 1.273 |
| 21 | 1.113 |
| 22 | 0.746 |
| 23 | 1.662 |
| 24 | 1.927 |
| 25 | 2.107 |
| 26 | 0.778 |
| 27 | 0.469 |
| 28 | 1.320 |
| 29 | 0.948 |
| 30 | 0.694 |
| 31 | 0.674 |
| 32 | 1.689 |
| 33 | 0.774 |
| 34 | 0.558 |
| 35 | 0.654 |
| 36 | 1.891 |
| 37 | 0.619 |
| 38 | 1.436 |
| 39 | 2.254 |
| 40 | 1.109 |
| 41 | 0.855 |
| 42 | 0.542 |
| 43 | 1.879 |
| 44 | 1.646 |
| 45 | 1.541 |
| 46 | 0.979 |
| 47 | 1.150 |
| 48 | 0.902 |
| 49 | 0.602 |
| 50 | 2.216 |
| 51 | 0.697 |
| 52 | 1.962 |
| 53 | 1.199 |
| 54 | 1.336 |
| 55 | 0.859 |
| 56 | 0.653 |
| 57 | 1.094 |
| 58 | 2.426 |
| 59 | 0.750 |
| 60 | 1.498 |
| 61 | 1.432 |
| 62 | 1.254 |
| 63 | 1.047 |
| 64 | 1.308 |
| 65 | 0.872 |
| 66 | 2.197 |
| 67 | 1.149 |
| 68 | 1.418 |
| 69 | 1.635 |
| 70 | 1.091 |
| 71 | 1.267 |
| 72 | 1.061 |
| 73 | 2.072 |
| 74 | 2.198 |
| 75 | 0.687 |
| 76 | 2.124 |
| 77 | 0.719 |
| 78 | 3.658 |

TABLE 2-continued

Cr concentration at each analysis point obtained
from WC powder of Comparative Example 1

| Analysis point | Cr concentration/(W concentration + Cr concentration) (mass %) |
|---|---|
| 79 | 0.803 |
| 80 | 1.149 |
| 81 | 0.680 |
| 82 | 0.809 |
| 83 | 1.123 |
| 84 | 0.642 |
| 85 | 0.575 |
| 86 | 1.218 |
| 87 | 1.642 |
| 88 | 1.381 |
| 89 | 2.691 |
| 90 | 0.714 |
| 91 | 0.788 |
| 92 | 0.704 |
| 93 | 1.222 |
| 94 | 1.454 |
| 95 | 1.613 |
| 96 | 0.824 |

TABLE 2-continued

Cr concentration at each analysis point obtained
from WC powder of Comparative Example 1

| Analysis point | Cr concentration/(W concentration + Cr concentration) (mass %) |
|---|---|
| 97 | 1.446 |
| 98 | 0.856 |
| 99 | 1.540 |
| 100 | 0.493 |
| 101 | 0.823 |
| 102 | 0.948 |
| 103 | 0.601 |
| 104 | 1.188 |
| 105 | 0.619 |
| 106 | 0.825 |
| 107 | 1.465 |
| 108 | 1.219 |

Figure 2:
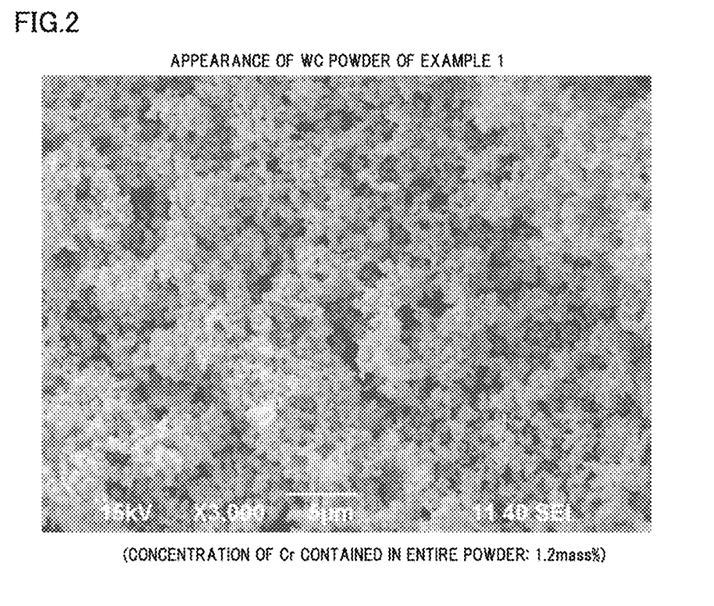
FIG. 2 is a photograph showing the appearance of a tungsten carbide powder of Example 1.

When FIGS. 2 and 3 are compared, it is clear that in Example 1 shown in FIG. 2 and Comparative Example 1 shown in FIG. 3, tungsten carbide powders similar in appearance were obtained.

From the data shown in Table 1, the standard deviation σ of the concentration of chromium in the tungsten carbide powder of Example 1 was analyzed be 0.444. Next, from the data shown in Table 2, the standard deviation σ of the concentration of chromium in the tungsten carbide powder of Comparative Example 1 was analyzed to be 0.774. That is, in the tungsten carbide powder according to the present disclosure, the standard deviation of the concentration of chromium is in a range of less than 0.5, and it is clear that chromium is more homogeneously distributed than the existing tungsten carbide powder.

Next, the relationship between the concentration of chromium in the tungsten carbide powder and the standard deviation in the present disclosure will be described with reference to Table 3.

TABLE 3

| | Sample No. | Cr concentration in WC powder (mass %) | Standard deviation of Cr concentration | Average particle size: FSSS (μm) | Fracture starting point during flexural test (number) | | | |
|---|---|---|---|---|---|---|---|---|
| | | | | | (1) Coarse WC | (2) Pore | (3) Co pool | (4) Unclear (normal) |
| Example | 10 | 0.1 | 0.336 | 0.48 | 8 | 0 | 0 | 52 |
| | 11 | 0.2 | 0.375 | 0.46 | 8 | 0 | 1 | 51 |
| | 12 | 0.5 | 0.413 | 0.54 | 5 | 0 | 2 | 53 |
| | 13 | 0.8 | 0.425 | 0.47 | 1 | 0 | 1 | 58 |
| | 14 | 1.6 | 0.393 | 0.46 | 0 | 0 | 1 | 59 |
| | 15 | 3.2 | 0.400 | 0.49 | 0 | 0 | 1 | 59 |
| | 16 | 4.8 | 0.430 | 0.45 | 0 | 0 | 0 | 60 |
| | 17 | 7.0 | 0.473 | 0.52 | 0 | 1 | 0 | 59 |
| | 18 | 9.6 | 0.488 | 0.47 | 0 | 9 | 1 | 50 |
| | 19 | 12.0 | 0.463 | 0.51 | 0 | 7 | 1 | 52 |
| Comparative Example | 110 | 0.1 | 0.475 | 0.56 | 19 | 0 | 0 | 41 |
| | 111 | 0.2 | 0.537 | 0.52 | 12 | 0 | 1 | 47 |
| | 112 | 0.8 | 1.075 | 0.48 | 11 | 0 | 1 | 48 |
| | 113 | 1.6 | 1.286 | 0.54 | 8 | 2 | 2 | 48 |
| | 114 | 3.2 | 1.935 | 0.46 | 7 | 5 | 2 | 46 |
| | 115 | 4.8 | 2.308 | 0.53 | 2 | 8 | 1 | 49 |
| | 116 | 7.0 | 2.750 | 0.57 | 3 | 14 | 1 | 42 |

The tungsten carbide powder of each of Examples 11 to 19 is produced by the same steps as those of Example 1 shown in Table 1, but differs in that, in the steps of obtaining the mixed dry powder (steps S1 to S3), the amount of the chromium-containing solution to be sprayed is adjusted so as to obtain a desired concentration of chromium. Furthermore, the tungsten carbide powder of each of Comparative Examples 111 to 116 is produced by the same steps as those of Comparative Example 1 shown in Table 2, but differs in that the amount of the $Cr_2O_3$ powder to be compounded is adjusted so as to obtain the concentration of chromium shown in Table 3. In these tungsten carbide powders, the standard deviation of the concentration of chromium was analyzed using SEM/EDS.

As shown in Table 3, even when the concentration of chromium in the tungsten carbide powder is 0.2% by mass or more and less than 7.0% by mass, in the tungsten carbide powders of Examples, the distribution of chromium is homogeneous compared with the powders of Comparative Examples, and at the time of producing a cemented carbide, an alloy which is homogeneous and whose strength is unlikely to be decreased is easily obtained. Furthermore, when the average particle size of the tungsten carbide powder is 0.8 µm or less, at the time of producing a cemented carbide, an alloy which is homogeneous and whose strength is unlikely to be decreased is easily obtained.

Evaluation of Homogeneity of Cemented Carbide

In the present disclosure, homogeneity of a cemented carbide was evaluated by the following procedure.

First, 7% by mass of a cobalt powder (average particle size 1.0 µm) is compounded with each of the tungsten carbide powders of Examples and Comparative Examples shown in Table 3, and the resulting compound is mixed with a ball mill using φ3 mm cemented carbide balls. In the compounding ratio, calculation is made assuming that the mass of chromium is contained in tungsten carbide. For example, mixing conditions can be such that the rotation rate is 90 rpm, an ethanol solvent is used, and the mixing time is 24 h.

After mixing, a mixed slurry is taken out of the ball mill and dried to obtain a dry powder.

Camphor as a binder is added in an amount of 2% by mass to the dry powder, and the resulting mixture is sifted through a 150 µm mesh sieve to produce a granulated powder.

The granulated powder is press-formed into a rectangular parallelepiped shape having 40 mm or more in width×12 mm in length×6 mm in height with a contact pressure of 9.8 kN/cm$^2$, and sintering is performed in a vacuum furnace. Sintering conditions can be appropriately selected within a range that is obvious to a person skilled in the art. For example, the conditions may be such that the rate of temperature rise is 10° C./min, the maximum temperature is 1,350° C., the holding time is 30 min, and a reduced-pressure nitrogen atmosphere (about 133 Pa) is set.

A flexural test is carried out on the resulting sintered compact in accordance with the Japan Cemented Carbide Tool Manufacturer's Association standard CIS026-1983. The shape of a specimen used is J-shape (refer to "4.1 Specimen size" of the Japan Cemented Carbide Tool Manufacturer's Association standard CIS026-1983), and the number of specimens is set to be 60 per each tungsten carbide powder.

After the flexural test, the specimens are collected, and breakage surfaces thereof are checked to find starting points using SEM/EDS. Types of starting point are classified as (1) coarse WC particle having a particle size three or more times larger than its surrounding WC particles, (2) pore (sintered pore), (3) Co pool (Co agglomeration), and (4) normal breakage in which an obvious fracture starting point is unclear. The forms of breakage of the specimens are classified by the types of starting point (1) to (4), which are shown in Table 3.

As shown in Table 3, in the powders according to Examples, the number of breakages originating from coarse tungsten carbide particles and pores is small compared with Comparative Examples, and the effect of homogeneous tungsten carbide powders can be confirmed. It is clear that, in Examples, when the standard deviation of the concentration of chromium is 0.5 or less, a cemented carbide which is homogeneous and has a small number of fracture starting points is obtained. In particular, when the concentration of chromium is 0.2% by mass or more and 7.0% by mass or less, no fractures originating from pores (sintered pores) occur, which is more preferable.

According to the present disclosure, because of homogeneous distribution of chromium, a homogeneous cemented carbide with no decrease in strength can be produced.

It should be considered that the embodiments disclosed this time are illustrative and non-restrictive in all aspects. The scope of the present invention is defined not by the embodiments described above but by the appended claims, and is intended to include all modifications within the meaning and scope equivalent to those of the claims.

REFERENCE SIGNS LIST

S1, S2, S3, S4, S5, S6, S7, S8 step

The invention claimed is:

1. A tungsten carbide powder comprising tungsten carbide as a main component and chromium,
wherein, when mass concentrations of tungsten and chromium are measured at 100 or more analysis points randomly selected from a field of view of SEM observation of the tungsten carbide powder, a standard deviation a of distribution of the ratio by percentage of the concentration of chromium to the total concentration of tungsten and chromium is 0.5 or less.

2. The tungsten carbide powder according to claim 1, wherein the ratio of the concentration of chromium to the total concentration of tungsten and chromium contained in the entire tungsten carbide powder is 0.1% by mass or more and 7.0% by mass or less.

3. The tungsten carbide powder according to claim 1, wherein the tungsten carbide powder has an average particle size of 1.0 µm or less.

4. A method for producing a tungsten carbide powder comprising:
a step of obtaining a mixed dry powder by mixing a tungsten oxide and a chromium-containing solution, followed by drying under stirring;
a step of obtaining a calcined powder by calcining the dry powder in the air atmosphere;
a step of obtaining a mixed powder by mixing the calcined powder and a carbon source powder; and
a step of obtaining a tungsten carbide powder by reducing the mixed powder by heat treatment in a hydrogen gas-containing atmosphere and carburizing the mixed powder at a temperature of 1,000° C. or higher.

* * * * *

UNITED STATES PATENT AND TRADEMARK OFFICE
CERTIFICATE OF CORRECTION

PATENT NO. : 11,396,451 B2
APPLICATION NO. : 17/601431
DATED : July 26, 2022
INVENTOR(S) : Masato Michiuchi et al.

It is certified that error appears in the above-identified patent and that said Letters Patent is hereby corrected as shown below:

In the Claims

Claim 1, Column 12, Line 32, "deviation a of distribution" should read --deviation $\sigma$ of distribution--.

Signed and Sealed this
Twenty-second Day of November, 2022

Katherine Kelly Vidal
*Director of the United States Patent and Trademark Office*